United States Patent Office 3,432,845
Patented Mar. 11, 1969

3,432,845
NUMERIC DISPLAY
Gavin L. Douglas and Jack W. Simpson, Sr., Lexington, Ky., assignors to International Business Machines Corporation, Armonk, N.Y., a corporation of New York
Filed Mar. 8, 1966, Ser. No. 532,713
U.S. Cl. 340—324                                     18 Claims
Int. Cl. G08b 23/00

ABSTRACT OF THE DISCLOSURE

Numeric characters are generated for a cathode ray tube display from predetermined character segments each produced by an individual AND circuit that combines appropriate time related beam blanking information and required character component information. Additionally, a 5-bit BCD code form is employed to advantage to assist in display of decimal points, grouping of digits by threes, and suppression of high order zeros.

---

This numeric display directly converts binary coded decimal data into time spaced unblanking pulses for operating a cathode ray tube display mechanism. A decimal point control method employed in our display is of broad value as it takes advantage of the data handling format, disclosed in U.S. patent application Ser. No. 489,877 entitled, "Computation with Variable Fractional Point Readout," by J. W. Simpson, filed Sept. 24, 1965. This format provides a multiorder code or group of five channels for each numeric character. Four of the channels contain conventional binary coded decimal data, and the fifth specifies whether a decimal point exists immediately to the right of the associated character.

Cathode ray tube character displays offer high speed, low cost, large digit capacity, and quiet operation. One disadvantage is the inability for such displays to directly generate hard copy. Accordingly, readability is a more critical factor than with permanent displays, such as printers.

There are many different approaches to cathode ray tube character displays. These include the use of a character matrix which screens the beam in a mask-like fashion to produce a character, as well as various stroking and dot pattern encoding circuits. All encoding circuits are rather complex; however, some are unnecessarily so due to a lack of directness in their method.

It has thus been an object of our invention to devise and develop a display method and implementing circuitry therefor to translate binary coded demical data directly into time spaced unblanking pulses for controlling a cathode ray tube.

Another object of our invention has been to devise and develop a method for clearly displaying a multidigit number including a decimal point from coded data presented in a special form, wherein the decimal point information is associated with the code of an individual character.

Another important object of our invention has been to devise and develop a display of enhanced readability by suppressing high order zeros. Where a number less than one is displayed, the zero immediately preceding a decimal point is not suppressed, thus rendering the decimal point more readable.

A further object of our invention has been to devise and develop a display of enhanced readability by grouping digits to the left of the decimal point in groups of three.

The character display phase of our invention involves the provision of a plurality of logical AND circuits, each representing different components of a display character, for directly combining binary coded decimal data with display raster time information. The resulting train of time based pulses in inherently synchronized with a deflection pattern of the cathode ray beam to produce the selected character components by unblanking control thereof.

The decimal point display phase of our invention is dependent on the aforesaid data format disclosed in U.S. patent application Ser. No. 489,877. Although the decimal point information is associated with an individual character code, it is displayed as a completely separate character for enhanced visibility, speed, and numeral compactness. The decimal point display is accomplished by first recognizing the presence of decimal point information associated with a character prior to the display of the character. The need for the decimal point display is stored while the character is being displayed. Mechanism for delivering the next succeeding character for display is inhibited and the decimal point is displayed during the dsplay cycle immediately following the character with which it was associated. After display of the decimal point, the next succeeding character is delivered to be displayed, and the mechanism continues as usual.

It is possible to reverse the sequence if desired and display the decimal first. In this event, the character is delivered twice for display, but is displayed only during the second display cycle.

Our method offers clear advantages over a technique wherein the decimal point is displayed within the same raster as its associated character. The raster required to produce such a configuration would be larger than required for non-decimal associated characters, thus reducing the display speed and lowering the entire display character density. In addition, the special readability phases of our invention are made particularly convenient and practical due to the special data decimal point format discussed above.

Detection of high order zeros for suppression is accomplished by reading digits of a multidigit number in sequence, beginning with high order digits, and monitoring the binary data to detect a significant bit in any channel. The data format gives complete freedom to read the digits in either direction. In this way it is a simple matter to recognize the first significant digit, including just a decimal point if desired, to end suppression of the display. By the association between character data and decimal point information, and the double cycle display method, it is possible to conveniently display the zero immediately to the left of a decimal, in the case of a pure fraction number.

Whole number digits are grouped in three's by reading digits in sequence, beginning with low order digits, and counting the digits by three's after recognition of a decimal point. Separation of the digits can be by extra space, insertion of commas, or both.

Both high order zero suppression and digit grouping can be accomplished together, by taking further advantage of the special data-decimal point format. Prior to display, the multidigit number is scanned, beginning with high order digits. A decimal point bit is written into each zero code read prior to the first non-zero number. The digits are read for display beginning with low order digits, and grouping is controlled as indicated above. Zero suppression is accomplished by recognition of the added decimal points.

These and other objects, features, and advantages of our invention will be apparent to those skilled in the art from the following description of a preferred illustrative embodiment thereof wherein specific reference is made to the accompanying drawings, of which:

Figure 1:
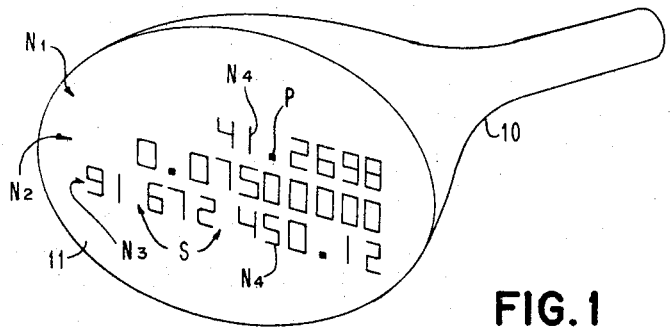
FIGURE 1 is a perspective view of a cathode ray tube illustrating the appearance of our display in operation.

In FIGURE 1 a cathode ray tube 10 is shown displaying three multidigit numbers $N_1$, $N_2$, and $N_3$ on its screen 11 and illustrating some of the characteristics of our invention. Note that the decimal or fractional points P are provided with the same display space or area as the numerical characters or digits $N_4$. Also, the decimal points P are located independently within each displayed number. High order zeros are suppressed with the exception of the zero immediately preceding the decimal point in fractional number $N_2$. In large number $N_3$, the characters $N_4$ are grouped in threes as visually separated by extra spacing zones S.

Figure 2:
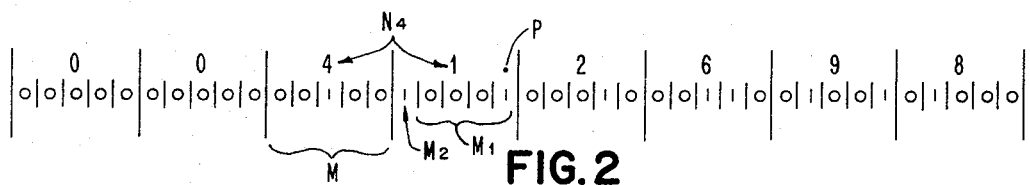
FIGURE 2 is an explanatory view of a multidigit display register as disclosed in U.S. patent application Ser. No. 489,877.

The data presented for display is preferably in a format as conceptionally illustrated in FIGURE 2. A 5-channel group or multiorder code M is provided for each character $N_4$ and includes four channels $M_1$ for identifying the character, and one channel $M_2$ for indicating the presence or absence of a decimal point P immediately adjacent and to the right of the associated character $N_4$. FIGURE 2 shows number $N_1$ of FIGURE 1 encoded in a binary form for clearer understanding.

Figure 3:
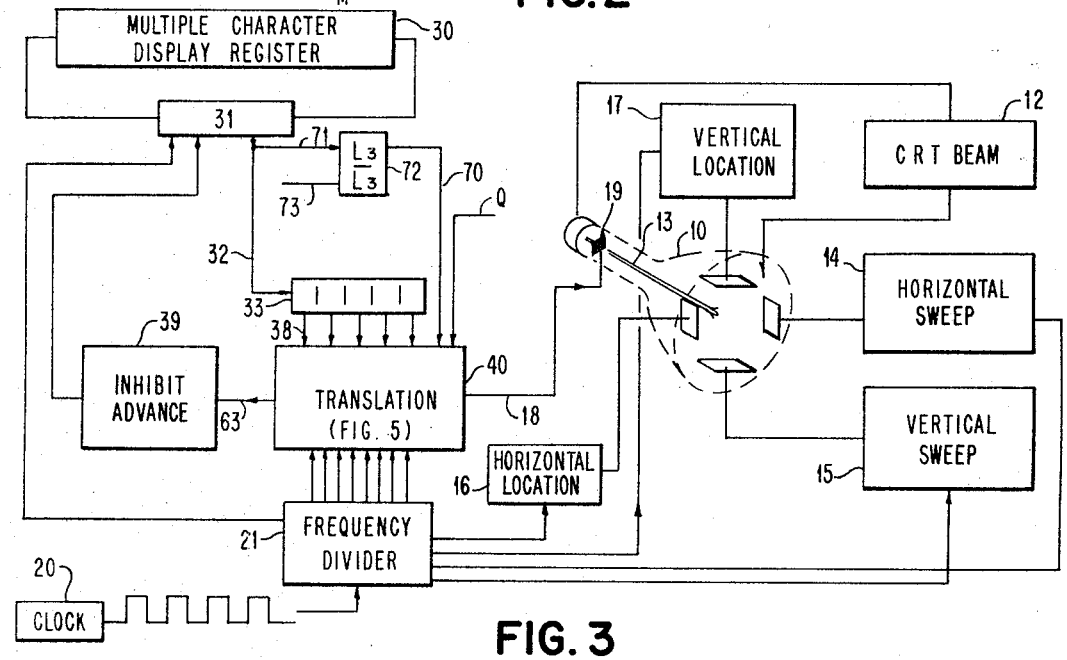
FIGURE 3 is a schematic block diagram showing the principal function components of our display.
Figure 4:
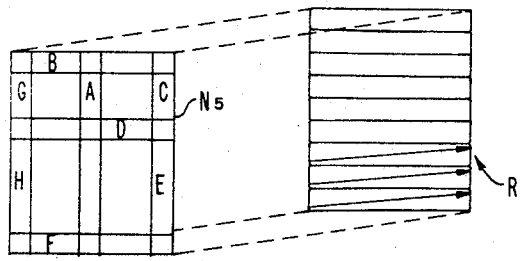
FIGURE 4 is an explanatory view of a basic character component and raster by which the character components are generated.

The display mechanism itself is generally shown in FIGURE 3 and has in operative connection therewith, the usual auxiliary circuits, such as high voltage circuit 12, for generating a beam 13, and horizontal and vertical sweep circuits 14 and 15, respectively, which in combination, generate a character size regular parallel line deflection pattern or raster R as shown in FIGURE 4. The auxiliary circuits also include step generating circuits 16 and 17 for positioning the raster R on the screen 11 in synchronism with the display of individual characters $N_4$. The details of suitable auxiliary circuits are within the skill of the electronics design art and require no further discussion. A clock, oscillator, or regular pulse source 20 provides a time base that operates through a frequency divider 21 to establish character, display time and generally synchronize the operation of the various components. Multidigit numbers presented for display are stored in a register 30 in the format described with reference to FIGURE 2. A code read-write delivery device or memory accessing means 31 delivers the multiorder code groups M one at a time from the register 30 over a line 32 to a single character storage device or register 33. The code group in register 33 is delivered to a direct translating beam control circuit 40. The circuit 40 also receives time base signals from the frequency divider 21 and directly merges this time and code information to provide a pulse train on control line 18 that selectively unblanks the beam 13 through grid 19. The pulse train is inherently synchronized with the horizontal and vertical sweep circuits 14 and 15 as their operation is also controlled by the clock 20 through frequency divider 21.

Character synthesis

Figure 5:
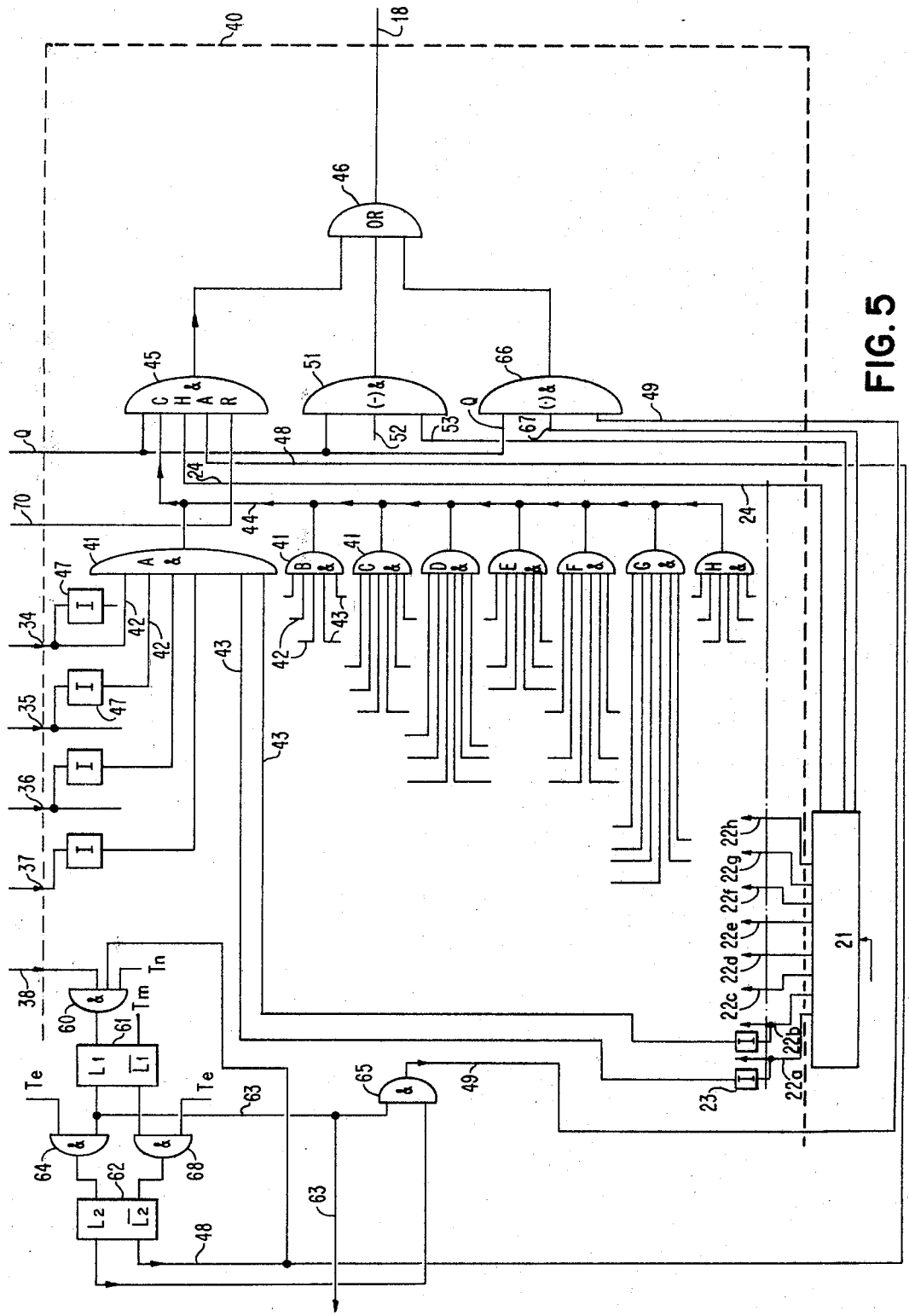
FIGURE 5 is a schematic circuit component diagram somewhat simplified and idealized for ease of understanding showing the internal mechanism of the translator of FIGURE 3.
Figure 6:
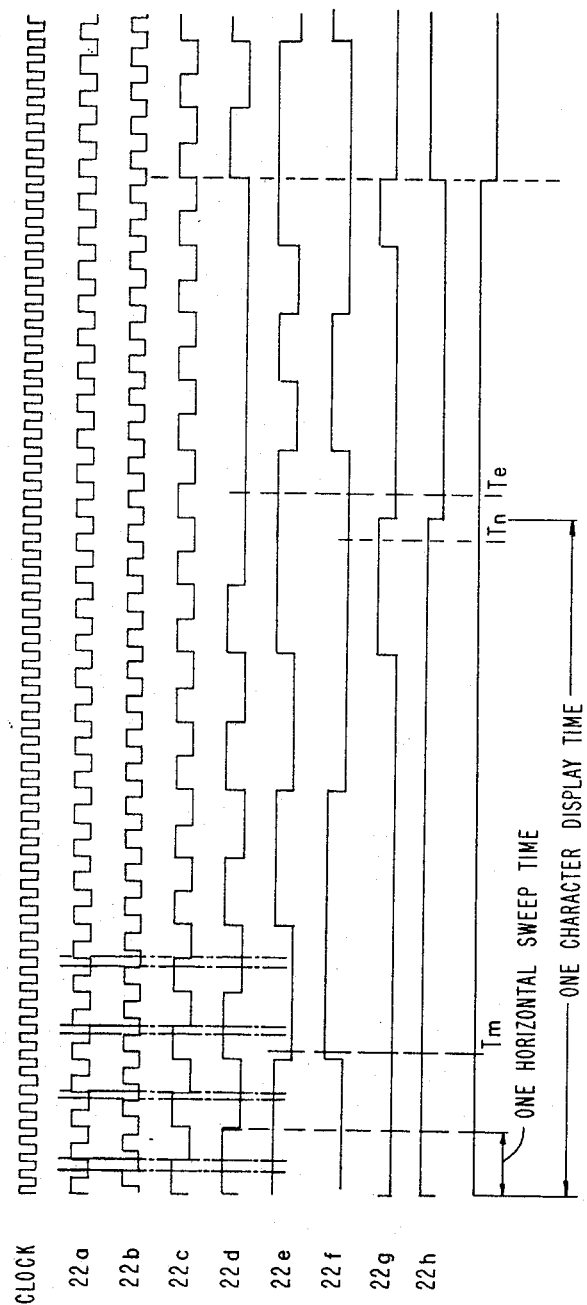
FIGURE 6 is a timing chart illustrative of a principle of operation of our invention.

The translating beam control circuit 40 is more completely shown in FIGURE 5, and is explained with the aid of FIGURES 4 and 6.

FIGURE 4 shows the components $N_5$ of a basic character form superimposed on the horizontal, parallel line raster R, and from which any number can be formed. The components are labeled as follows:

A—vertical center line
B—top horizontal line
C—upper right hand vertical line
D—middle horizontal line
E—lower right hand vertical line
F—lower horizontal line
G—upper left hand vertical line
H—lower left hand vertical line The relationship between numerals and their associated components is given by the following table:

| | |
|---|---|
| 1 | A |
| 2 | B, C, D, F, H |
| 3 | B, C, D, E, F |
| 4 | C, D, E, G |
| 5 | B, D, E, F, G |
| 6 | B, D, E, F, G, H |
| 7 | B, C, E |
| 8 | B, C, D, E, F, G, H |
| 9 | B, C, D, E, F, G |
| 0 | B, C, E, F, G, H |

Circuit 40 (see FIGURE 5) includes a plurality of logical AND devices or circuits 41, each of which is labeled with a letter A through H corresponding to the character components $N_5$ of FIGURE 4. The specific interconnections between the AND devices 41 and the code and clock sources are omitted for simplicity and ease of understanding, with the exception of the connections for component A which illustrates the principles involved. The construction of the remaining interconnections is a matter of design optimization that is within the skill of the art and is not necessary to a full understanding of our invention.

Each logical AND device 41 has a plurality of inputs 42 and 43 by which it receives, respectively, character code and time base synchronization data from the register 33 and the frequency divider 21. The AND devices 41 recognize the coincidence between code data requiring certain character components $N_5$, and the time segments in the pattern R during which beam 13 must be unblanked to generate that component. The outputs of all AND devices 41 are delivered to a common control line 44 and through a character display control logical AND device 45 and merging logical OR device 46 to the beam control line 18.

Individual channels of the register 33 are connected to the translating circuit 40 by respective data lines 34, 35, 36, and 37. Each data line has a conventional inverter circuit 47 connected therewith, thus making directly available the information as to whether or not a "bit" exists in an associated channel of the multiorder code group in register 33. Similarly, the frequency divider or pulse generation circuit 21 provides a plurality of different pulse trains on each of a plurality of time base lines 22a–22h. Typical wave forms of suitable pulse trains are shown in FIGURE 6 and are labeled according to their respective time lines shown in FIGURE 5. The technology for constructing the mechanism 21 is well known, and an example of similar mechanism is found in U.S. Patent 2,754,450, "Register Display Devices," of G. F. Bland, issued July 10, 1956. The time lines 22a–22h are provided with inverters 23, thus making directly available the information as to whether or not at any instant a pulse train on a time line 22a–22h is one of two preselected voltage levels which may be arbitrarily designed "up" or "down." By selecting appropriate combinations of the lines 22a–22h and their inverses, the significant portions of raster R can be identified.

Taking as an example, the A component $N_5$ (see FIGURE 4), it is first noted that this component is employed only for the number "1" and represents the only component in that number. The binary code for the number "1" is 0001. The AND devices recognize a coincidence of "up" pulses. Accordingly, data line 34 is directly connected or wired to the data inputs 42 of the "A" AND device 41 and data lines 35, 36 and 37 are connected to the "A" AND device 41 through the inverters 47. The "A" AND device can thus generate a pulse on its output line only in the presence of a bit or "up" pulse on line 34 and the absence-of-bits or "down" pulses on lines 35, 36 and 37.

Component A is the vertical center line and as such is generated by unblanking the beam 13 at the center of each horizontal stroke or line of the raster R.

From FIGURE 6 it is seen that a pulse train on time lines 22a and 22b are both down for a short period of time just to the left of the center of the "up" and "down" pulse segments in train 22d, each of which represents a horizontal stroke of the raster R. These same pulse trains are also down at the right hand edge of each segment in train 22d. However, this time is allowed for retrace and beam unblanking is inhibited by other means. Accordingly, the coincidence of $\overline{22a}$ and $\overline{22b}$ can be employed to cause beam unblanking for a limited time at the center of each horizontal stroke, and thereby generate component "A". This is implemented, as shown in FIGURE 5, by connecting time lines 22a and 22b through inverters 23 to synchronization inputs 43 of the "A" AND device 41. It can now readily be seen that whenever the binary number 0001 is presented for display in register 33, the logical requirements of "A" AND device 41 will be satisfied at the center of each horizontal stroke. The output generated will cause component "A," which incidentally is the entire number "1," to be displayed on the screen 11.

As mentioned above, the common control line 44 is connected to a character control AND device 45 that employs other control factors that apply to all character generation. For example, control factors indicated generally by input line Q may include information indicating that the equipment is busy and cannot deliver data to the display registers, etc. An input is also provided from the frequency divider 21 as shown on a typical line 24 to provide such controls as inhibiting all output during beam retrace time. A further input line 70 is provided to inhibit character generation under certain conditions such as for high order zero suppression, and an input 48 is employed to inhibit character generation when a decimal point is required, both as hereinafter described.

The operation of character synthesis translator 40 can be summarized by consideration of the number "7". The binary code for this number is 0111 and this code is connected to the input lines 42 of the "B," "C" and "E" AND devices 41 such that these, and only these, AND devices can be satisfied during this display time. Appropriate connections are made between selected time lines 22a–22g and the time inputs of the "B," "C" and "D" AND devices. As the raster R (see FIGURE 4) is executed from bottom the top by sweep circuits 14 and 15, the "E" AND device generates a short output near the end of each of the first six strokes, "C" AND device generates a short output near the end of each of the last four strokes, and "B" AND device generates a full stroke length output during the last stroke (note the overlap). All of the outputs thus generated are delivered through AND device 45, and OR device 46 to the beam control line 18.

Auxiliary characters, such as a minus (—) sign, can be generated, if desired, by the use of special AND devices such as 51 which merges information on input 52 with time information on input 53 to generate an appropriate synchronized unblanking signal on line 18.

Figure 7:
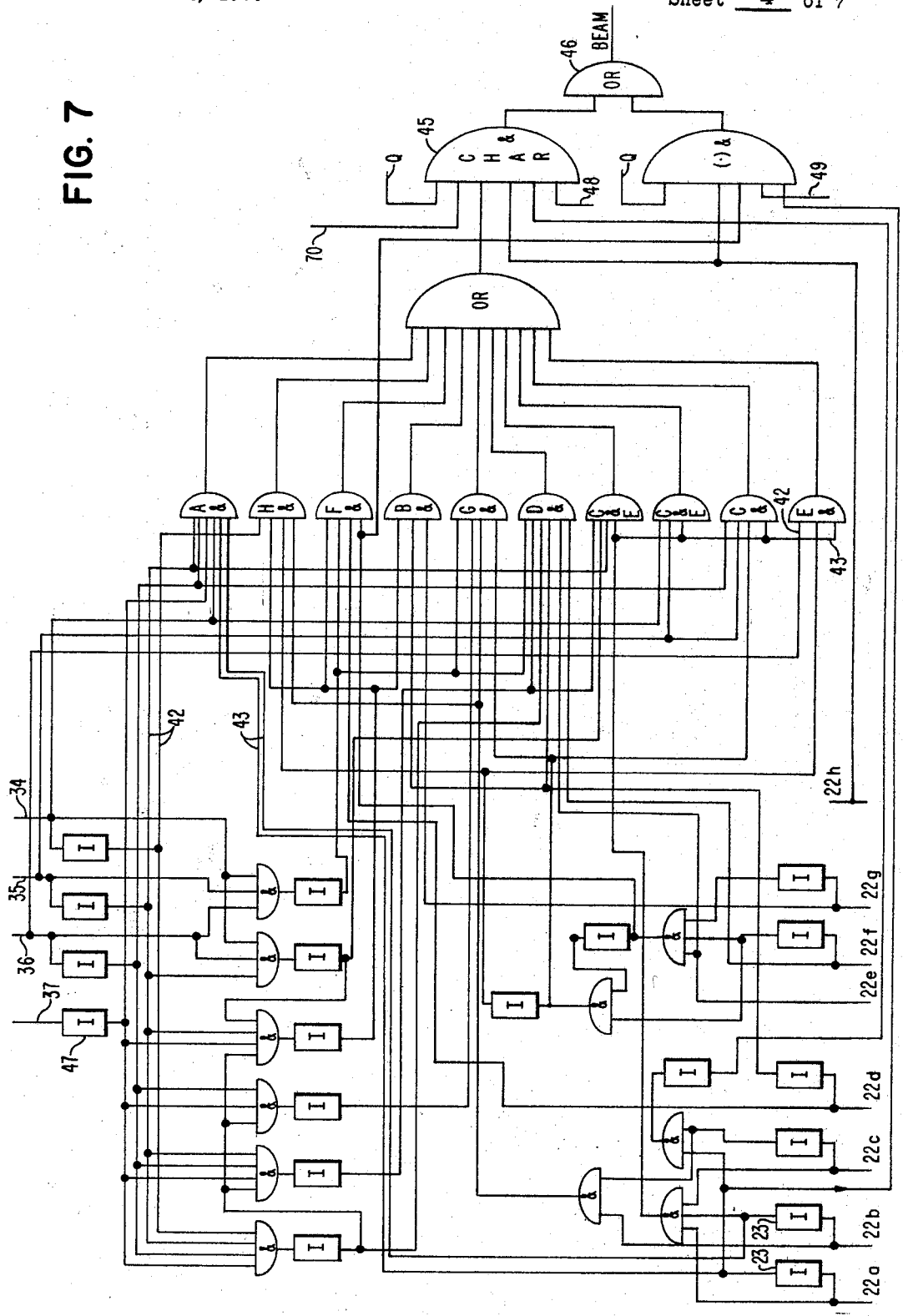
FIGURE 7 is a more detailed circuit diagram showing a preferred embodiment of the concepts illustrated in FIGURE 5.

A preferred logic approach to the various interconnections with component AND devices is shown in FIGURE 7. Note the use of subcombinations and component duplication for efficiency.

Decimal point display

The information as to decimal point display requirements is made available with each code group placed in the single character storage register 33 due to the special data format employed. A data line 38 is provided for making this information available to the translator 40. The data line 38 and a suitable strobing pulse or cycle time input $T_N$ indicative of a time late in the character display cycle (see pulse train 22h of FIGURE 6), but before data has been lost from charatcer register 33, are connected as joint inputs to a decimal point detection AND device 60 (see FIGURE 5). A pair of bistable latches 61 and 62 provide storage for the control information employed to cause the display of a character associated with a decimal point, without advance of code group delivery device (counter, etc.) 31, and during the immediately following display time causing display of the decimal point. Latch 62 is also connected to the input of detection AND device 60 through signal line 48 to permit detection only on the first of the two display times.

Output by detection AND device 60 causes latch 61 to be set to a state L1 and the existence of state L1 immediately generates a control signal on line 63 to the control mechanism 39 (see FIGURE 3) that inhibits the advance of delivery device 31, thereby preventing the next suceeding character in display register 30 from being delivered to single character register 33 in the normal manner.

At a cycle time $T_e$ (derived from frequency divider 21 and indicative of a time between character display times—see FIGURE 6), an AND device 64 is satisfied, setting the latch 62 to a state L2. The existence of state L2 inhibits output of character control AND device 45 by elimination of requisite state $\overline{L2}$ on input 48. Accordingly, although the same character information exists in the single character register 33 for the two successive display times, the character is not displayed during the second display cycle. The combined existence of states L1 and L2 is retained until a time $T_m$ (see FIGURE 6) subsequent to the first few strokes of raster R, and is detected by an AND device 65 to pass a data control signal over line 49 to decimal point synthesis AND device 66. The decimal point AND device 66 also receives synchronization timing information from the frequency divider 21 over line 67. The data and timing signals are merged in the AND device 66 to unblank center located dots during the first two or lower horizontal strokes of the raster R and thereby generate a decimal point. Ancillary control information on input Q operates as described in connection with AND device 45.

At time $T_m$, which occurs during the decimal point display time, but after the decimal point has been displayed, latch 61 is reset to its normal $\overline{L1}$ state. The control lines 63 thus are inactivated and control mechanism 39 no longer inhibits advance of the code delivery device 31 at its appropriate time. At cycle time $T_e$ which occurs immediately following the entire second character display time and is detected by AND device 68 (see FIGURE 5), latch 62 is reset to its $\overline{L2}$ state thereby re-enabling character control AND device 45 to pass character output. Characters supsupplied to register 33 for display in the following and each succeeding display time will be displayed normally in synchronism with horizontal stepping circuit 16.

High order zero suppression (see FIGURE 3)

Suppression of zeros to the left of the first significant digit or decimal point in a multidigit number is readily accomplished due to the special data format employed. The multiorder code group stored in display register 30 can be delivered in sequence by device 31 beginning either with high order or low order digits. High order zeros are readily detected by operating the delivery device 31 beginning with high order digits and monitoring delivered codes in search of any "bit" or a logical "1" in any channel, including decimal channel $M_2$ (FIGURE 2). Display suppression as controlled by input line 70 to AND device 45 ends upon detection of a "bit." A monitor line 71 is connected to delivery line 32 and to a bistable latch 72. The passage of any "bit" on line 32 sets the latch 72 to a state L3. The L3 state is required on input line 70 for the character control AND device 45 to pass character forming pulses. Accordingly, all zeros prior to delivery of the first significant digit or decimal point will not be displayed. The character delivered during the display cycle wherein latch 72 goes to state L3, and all lower order characters, will be displayed as their character components can pass the control device 45. The zero before the decimal point in the case of a pure fraction, such as number $N_2$ (FIGURE 1), is thus automatically displayed to make the decimal point more discernable. After all characters in the register 30 have been displayed, a reset signal is supplied over input line 73 by the frequency divider 21 to reset latch 72 to its normal $\overline{L3}$ state.

Modified zero suppression with digit grouping

Figure 8:
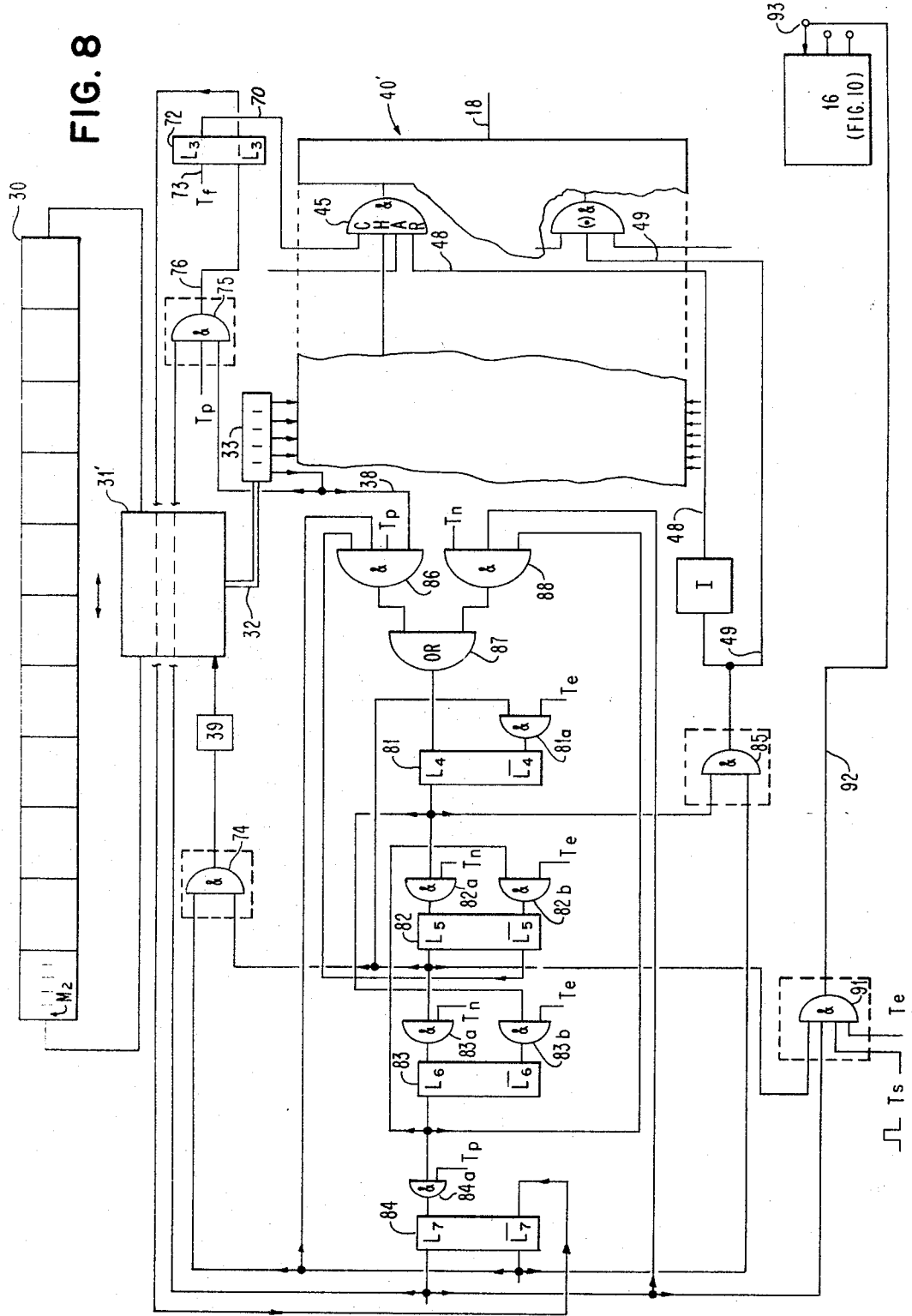
FIGURE 8 is a partial circuit component diagram of a modification of the translator shown in FIGURES 3 and 5.

In FIGURE 8 there is shown a modified translating beam control circuit 40' generally similar to circuit 40 of FIGURES 3 and 5. To the extent that parts remain essentially unchanged, they are numbered as in FIGURES 3 and 5, or are deleted all together from FIGURE 8. This modification has the ability to both suppress high order zeros and to group digits to the left of the decimal in threes to assist readability. Number $N_3$ of FIGURE 1 provides a picture of the display obtained.

Prior to any display the multiorder code groups are passed through the read-write delivery control or memory access device 31' in sequence from left to right, beginning with high order digits, and each code is examined for the presence of a significant digit or decimal point. Each code not having a significant digit or a decimal point is modified by device 31' by the insertion of a decimal point indication in its decimal bit location $M_2$ (see FIGURE 2). When the first significant digit or a decimal point is recognized, no further code modification is done. In this way the high order zeros are flagged for future reference.

After display of the contents of register 30, the codes are first accessed in order back through the read-write device 31' beginning with low order digits and all decimal bits after the first are erased before making other use thereof where the flag decimal point would provide erroneous indications. The particular mechanism for performing these functions is within the skill of the art. Accordingly, a detailed description is omitted for simplicity.

Having flagged high order zeros, display is accomplished by reversing the delivery device 31', thus supplying codes in sequence to the single character register 33 beginning with lower order digits.

The characters are synthesized as previously described. Several functions, however, are different from those performed in FIGURES 3 and 5. The decimal associated with a character is displayed prior to that character; mechanism is provided for recognizing the first decimal and counting digits by threes thereafter to group left-hand digits by threes, either by providing additional space for grouping or by insertion of commas or both, and finally zeros are suppressed by recognition of the flag bits inserted as indicated above. All of these funcions are controlled by recognizing the presence of a decimal point bit on data line 38.

Four bistable latches 81, 82, 83 and 84 are provided to keep track of the number of decimal point bits read and to count digits to control these functions.

The states of these latches are supplied to several control AND devices to accomplish the performance of the functions. Specifically, character display is inhibited, and decimal display caused by AND device 85 through input lines 48 and 49, respectively. AND device 85 responds to the coincidence of states L4 (latcth 81) and $\overline{L7}$ (latch 84) which indicates the first presentation of a decimal bit.

Advance of the code delivery device 31' is inhibited by AND device 74 through control mechanism 39. AND device 74 responds to a coincidence of states L5 (latch 82) and $\overline{L7}$ (latch 84) which indicates the end of the first display time during which a decimal bit was presented.

High order zero suppression is accomplished by AND device 75 through the latch 72 and the character control AND device 45. AND device 75 responds to a coincidence of a decimal bit on data line 38, a strobe or cycle timing signal $T_p$ (just prior to display time, see FIGURE 9), and a state L7 (latch 84) which indicates the first presentation of a "flag" decimal bit.

Digit grouping is accomplished by AND device 91 which generates a timed pulse on line 92 to an auxiliary input 93 of the horizontal stepping circuit 16. Capacitor 95 is normally discharged in preset increments under control of pulses on the BASIC input. As shown in FIGURE 10 a pulse on auxiliary input 93 provides additional control current to transistor cascade 94, permitting a greater than normal discharge of capacitor 95 and thereby creating a greater than normal raster locating voltage change and horizontal spacing between adjacent characters. AND device 91 responds to a coincidence of state L5 (latch 82), state L7 (latch 84), is a strobe or timing signal $T_e$ (just after display time, see FIGURE 9), and a signal length or time control pulse $T_s$. This coincidence indicates the time immediately following every third digit to the left of the decimal point.

Figure 9:
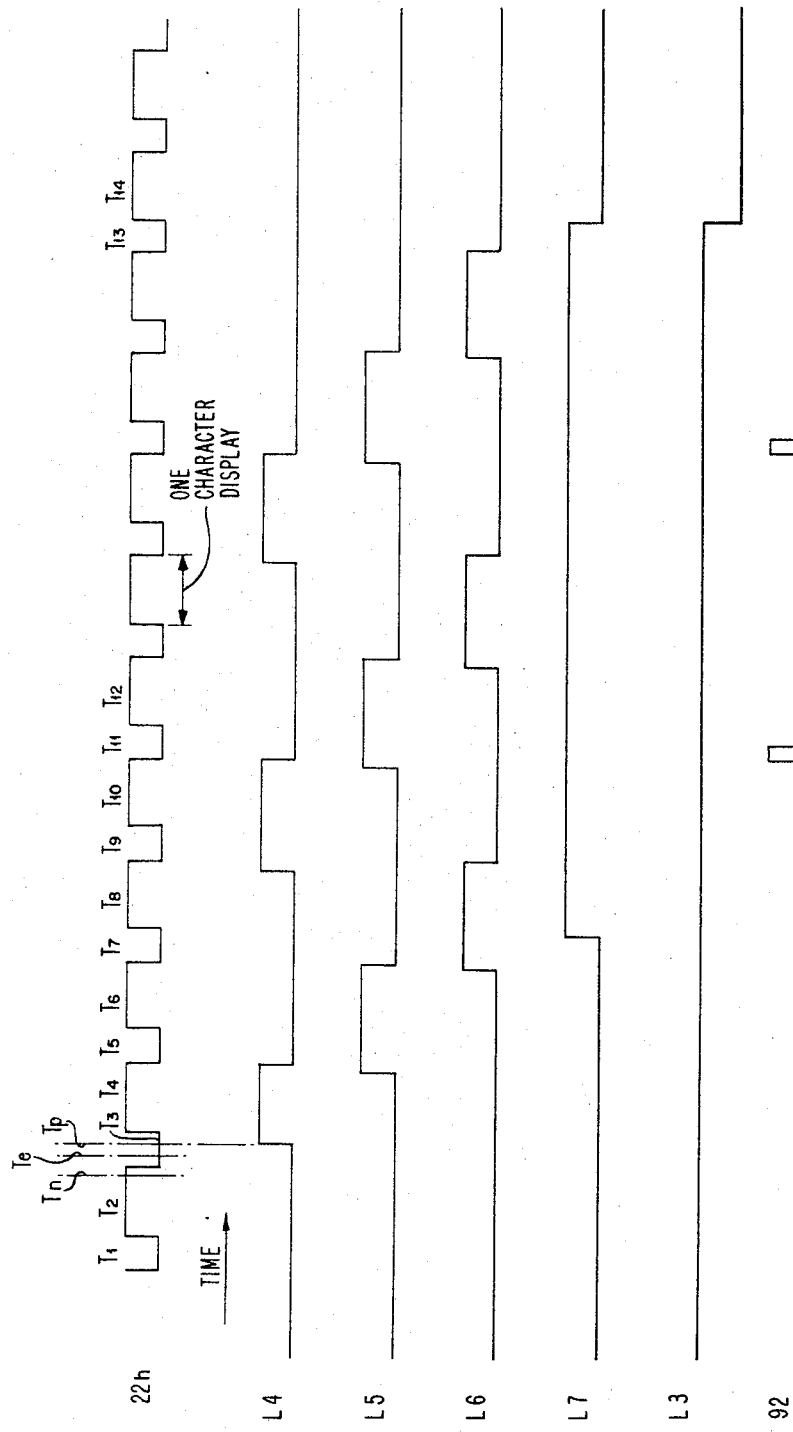
FIGURE 9 is a timing chart illustrative of the operation of the modification shown in FIGURE 8.
Figure 10:
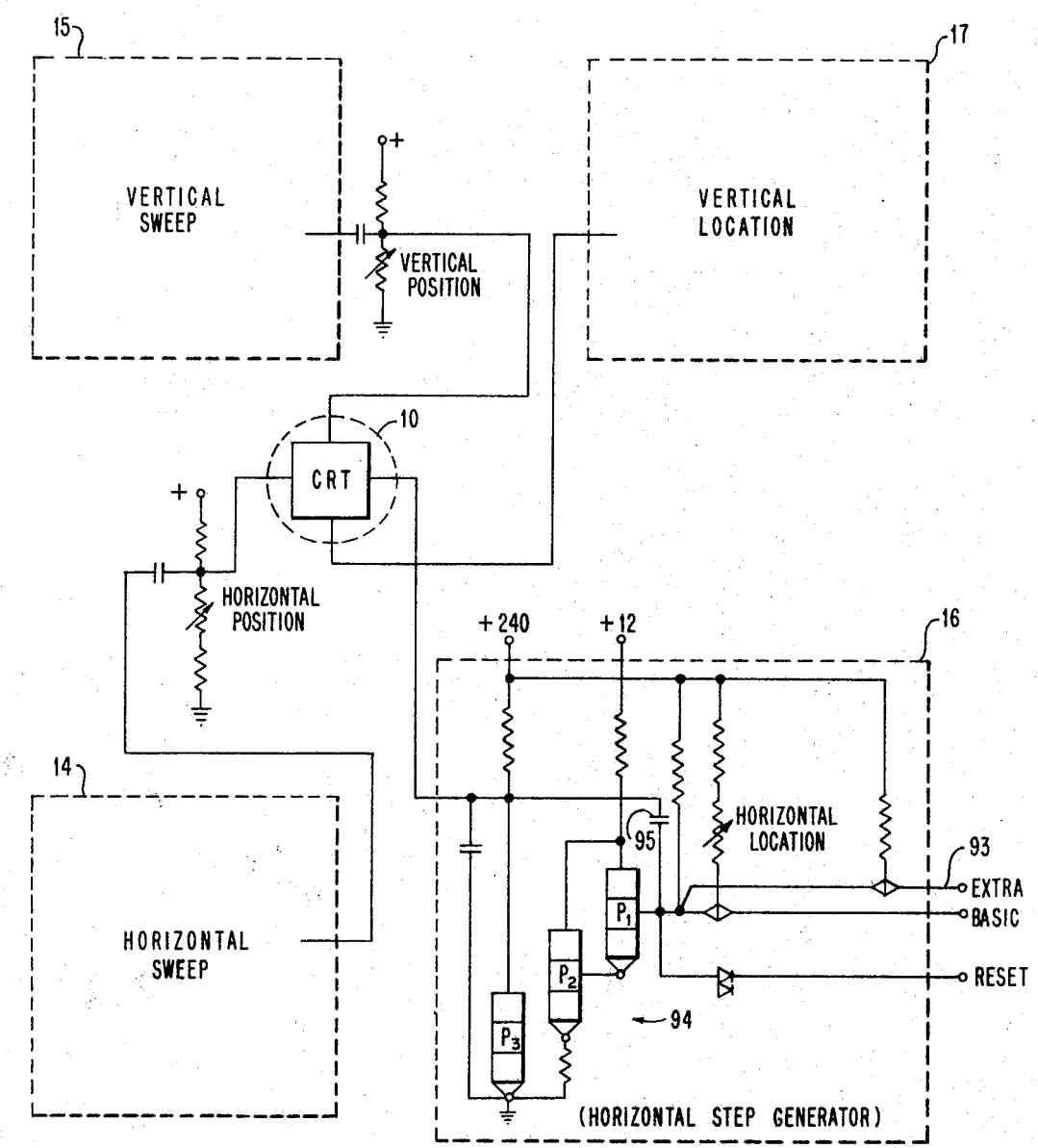
FIGURE 10 shows a modified horizontal locating circuit for use with the translator modification of FIGURE 8.

The mechanism can be easily understood by following a multidigit display sequence with reference to the timing diagram of FIGURE 9. The low order or right hand most character of the multidigit number is loaded from the register 30 into the register 33 during time period $T_1$. This character is displayed during time period $T_2$. The next succeeding code is loaded into the register 33 during time period $T_3$. Assume this code has a decimal point associated with it. A bit thus exists on data line 38 by the decimal point information, and at cycle time $T_p$, detection AND device 86 is satisfied and generates an output setting latch 81 to its state L4 through OR device 87. The AND device 86 also requires the states $\overline{L5}$ and $\overline{L7}$ to determine that this is the first decimal being read in the multidigit numeral. Immediately AND device 85 is satisfied causing decimal point display and inhibiting character display during the time period $T_4$.

At cyce time $T_n$, near the end of display time period $T_4$, AND device 82a sets the latch 82 to state L5. Immediately the AND device 74 is satisfied, thereby inihibiting the advance of the code delivery device 31'.

At cycle time $T_e$, after the end of display time period $T_4$, an AND device 81a resets latch 81 to its $\overline{L4}$ condition. During time period $T_5$ the same code group as that just displayed and containing the decimal information is loaded into register 33 due to the non-advance of accessing device 31' to the next character in register 30. The decimal point bit on line 38 does not set latch 81, however, as condition $\overline{L5}$ no longer exists, and thus the detector AND device 86 is not satisfied. Accordingly, the character associated with the decimal point will be displayed during the display time period $T_6$.

At cycle time $T_n$ near the end of the display time period $T_6$, an AND device 83a will be satisfied and set the latch 83 to its state L6, thus counting the first digit to the left of the decimal point. At cycle time $T_e$ after the end of display time $T_6$, an AND device 82b resets latch 82 to its $\overline{L5}$ condition. The AND device 74 no longer is active due to the absence of the state L5, and further characters will be displayed in normal sequence. The next character will be loaded into register 33 during time period $T_7$. At cycle time $T_p$, prior to display time period $T_8$, an AND device 84a sets the latch 84 to state L7, thus remembering that the true decimal point has been displayed. Assuming the code just loaded has not "flag" decimal bit, meaning it is a significant digit, it will be displayed during time $T_8$. At cycle time $T_n$, near the end of time $T_8$, an AND device 88 operates through OR device 87 to set latch 81 to its L4 state, thus counting the second digit to the left of the decimal point. A decimal point is not displayed, nor are characters inhibited as the AND device 85 is not satisfied due to the absence of the state $\overline{L7}$. At cycle time $T_e$, just after the end of display period $T_8$, an AND device 83b resets latch 83 to its $\overline{L6}$ state.

The succeeding character is loaded into register 33 during time period $T_9$ and displayed during time $T_{10}$ with the resultant setting of latch 82 to state L5 thereby counting the third digit to the left of the decimal point, and thereafter resetting the latch 81 to its $\overline{L4}$ state as previously explained. At cycle time $T_e$ following display time $T_{10}$ and during loading time $T_{11}$, the AND device 91 is satisfied and generates the timed extra space pulse (simultaneously with a Basic space pulse) on line 92, causing the insertion of extra space between the character just displayed (time $T_{10}$) and the following character (time $T_{12}$). The latches L4, L5 and L6 thus perform as a count-by-three ring counter in addition to other services provided, and each three digits to the left of the decimal point will be separated by an extra space as generated by AND device 91.

Later in the sequence a high order zero may be loaded into register 33 as during time $T_{13}$. This fact will be recognized by the presence of the "flag" decimal point which was written prior to the display sequence as explained above. At cycle time $T_p$ prior to the following display time $T_{14}$, the AND device 75 sets the latch 72 to state $\overline{L3}$ through line 76. As described in connection with FIGURE 5, the character display control AND device 45 requires state L3 on input line 70 thereof to permit character display. Accordingly, further display is inhibited for the remainder of the digit codes in the number. State $\overline{L3}$ also resets the latch 84 to its state $\overline{L7}$, thus permitting the counter composed of latches 81, 82 and 83 to run down by removing a requisite input to AND device 88 thus breaking the connection between latches 83 and 81. Latch 72 remains in state $\overline{L3}$ until a reset signal is received on line 73 at the end of total scanning of the register 30.

It will be understood that the character grouping of our invention is independent of the high order zero suppression and can be employed separately therefrom if desired.

Those skilled in the art will recognize that we have provided an efficient and readable display. It will also be recognized that our display takes advantage of the inherent value of a numerical character handling system employing a five channel multiorder code to associate fractional point location with a particular character. In particular, it is seen that our display provides a clear display of the decimal point that is separated from adjacent characters. The decimal point storage format is employed to obtain either or both high order zero suppression and digit grouping for increased presentation clarity.

While we have set forth some illustrative embodiments of our invention in detail to the extent necessary to enable one skilled in the art to make and use our invention, it will be understood that modifications, additions, and deletions can be made without departing from the spirit and scope of our inventive concepts as defined only by the appended claims.

We claim:
1. In a mechanism controlled by multiorder permutation code groups for displaying characters defined thereby on a cathode ray tube screen including means for generating a cathode ray beam in the tube, a time base, vertical and horizontal sweep circuits operatively connected to the cathode ray tube and to the time base, and controlled by the time base for deflecting the beam in accordance with a predetermined pattern, the translation means comprising:
   a plurality of logical AND devices each operatively connected with the tube for selectively permitting and preventing said beam from striking said screen, each of said AND devices representing a component part of at least one character to be displayed and having at least two inputs, at least one of said inputs of each logical AND device being operatively connected to receive control information from one of the multiorder permutation code groups, and at least one of said inputs of each logical AND device being operatively connected to the time base to receive therefrom synchronization information relative to the pattern; said operative connection between said time base and said logical AND devices comprising:
   means for deriving a plurality of different repetitive pulse trains from the time base, and
   means for delivering different ones of said pulse trains to said logical AND devices for identifying different time portions of the deflection pattern.
2. Cathode ray tube display mechanism as defined in claim 1 wherein the regular deflection pattern comprises essentially a plurality of closely adjacent parallel lines.
3. Cathode ray tube display mechanism as defined in claim 1 wherein said multiorder code groups each identify both a specific numerical character and the presence or absence of a fractional point immediately adjacent thereto, said display mechanism further comprising:
   means for storing the multiorder code groups for digital components of a multidigit number,
   means normally operating to deliver said multiorder code groups one at a time into cooperative relationship with said logical AND devices,
   means for displacing said regular deflection pattern across said screen to successive character locations, in operative synchronism with the operation of said delivery means,
   means for establishing sequential character display times in alternate synchronism with said displacing means,
   means for detecting the presence of a fractional point in said delivered multiorder code groups,
   means responsive to the detection of a fractional point for:
      (a) preventing said delivery means from operating to deliver the next succeeding code groups in said number at its normal time;
      (b) inhibiting display of one of said fractional points and said character associated therewith during a first display time, and
      (c) permitting display during said first display time of the other of said fractional point and character associated therewith, and
   means operative during the display time immediately following said first display time for preventing display of said other of said fractional point and character associated therewith and for permitting display of said one of said fractional point and character associated therewith during said immediately following display time.
4. Cathode ray tube display mechanism as defined in claim 3 wherein said character associated with a fractional point is displayed in said first display time and the fractional point is displayed in said following display time.

5. Cathode ray tube display mechanism as defined in claim 3 wherein said delivery means delivers said multiorder code groups in sequence beginning with code groups representing high order digits, the mechanism further comprising:
- bistable means having normally active first state of operation and a normally inactive second state of operation for respectively preventing and permitting output operation of said display, and
- means responsive to delivery of any multiorder code by said delivery means that includes either fractional point or non-zero information for causing said bistable means to change from its first to its second state.

6. Cathode ray tube display mechanism as defined in claim 3 wherein said delivery means delivers said multiorder code groups in sequence beginning with code groups representing low order digits, the mechanism further comprising:
- means for counting display times after display of a fractional point, and
- means controlled by said counting means for visually separating digits displayed after the display of said fractional point into multiple digit groups.

7. Cathode ray tube display mechanism as defined in claim 6 further comprising:
- means operative prior to delivery of any multiorder code group of the multidigit number by said delivery means for modifying all high order zero code groups therein to each include an indication of a fractional point associated therewith, and
- means operative prior to the display controlled by each code group and responsive to the presence of a fractional point indicating a high order zero, for preventing visual output operation of said display.

8. Cathode ray tube display mechanism as defined in claim 3 further comprising:
- means operative prior to delivery of any multiorder code group of the multidigit number by said delivery means for modifying all high order zero code groups therein, each to include an indication of a fractional point associated therewith, and
- means operative prior to the display controlled by each code group and responsive to the presence of a fractional point indicating a high order zero, for preventing visual output operation of said display.

9. Mechanism controlled by multiorder permutation code groups for displaying multidigit numbers wherein each multiorder code group identifies both a specific numerical character and the presence or absence of a fractional point immediately adjacent thereto, said display mechanism comprising:
- means for storing all multiorder code groups for a multidigit number,
- means for establishing sequential character display times,
- means operating character-by-character on multiorder code groups delivered to a controlling relationship therewith for generating visual display of said multidigit number,
- means normally operative to deliver said multiorder code groups one at a time into controlling relationship with said display generating means in operative synchronism with said established display times,
- means for detecting the presence of a fractional point in said delivered multiorder code groups,
- means responsive to the detection of a fractional point for:
    (a) preventing said delivery means from operating to deliver the next succeeding multiorder code group in said number at its normal time;
    (b) inhibiting display of one of said fractional point and character associated therewith during a first display time, and
    (c) permitting display during said first display time of the other of said fractional point and character associated therewith, and
- means operative during the display time immediately following said first display time for preventing display of said other of said fractional point and character associated therewith and for permitting display of said one of said fractional point and said character associated therewith during said immediately following display time.

10. Display mechanism as defined in claim 9 wherein said character associated with a fractional point is first displayed and the fractional point is displayed in said following display time.

11. Display mechanism as defined in claim 9 wherein said delivery means delivers said multiorder code groups in sequence beginning with code groups representing high order digits, the mechanism further comprising:
- bistable means having a normally active first state of operation and a normally inactive second state of operation for respectively preventing and permitting output operation of said visual display generating means, and
- means responsive to delivery of any multiorder code group by said delivery means that includes either fractional point or non-zero information for causing said bistable means to change from its first to its second state.

12. Display mechanism as defined in claim 9 wherein said delivery means delivers said multiorder code groups in sequence beginning with code group representing low order digits, the mechanism further comprising:
- means for counting display times after display of a fractional point, and
- means controlled by said counting means for visually separating digits displayed after the display of said fractional point into multiple digit groups.

13. Display mechanism as defined in claim 12 further comprising:
- means operative prior to delivery of any multiorder code group of the multidigit number by said delivery means for modifying all high order zero code groups therein to each include an indication of a fractional point associated therewith, and
- means operative prior to the display controlled by each code group and responsive to the presence of a fractional point indicating a high order zero, for preventing output operation of said visual display generating means.

14. Display mechanism as defined in claim 9 further comprising:
- means operative prior to delivery of any multiorder code group of the multidigit number by said delivery means for modifying all high order zero code groups therein to each include an indication of a fractional point associated therewith, and
- means operative prior to the display controlled by each code group and responsive to the presence of a fractional point indicating a high order zero, for preventing output operation of said visual display generating means.

15. Mechanism controlled by multiorder permutation code groups for displaying multidigit numbers wherein said multiorder code groups each identify both a specific numerical character and the presence or absence of a fractional point immediately adjacent thereto, said display mechanism comprising:
- means for storing the multiorder code groups for a multidigit number,
- means for establishing sequential character display times,
- means operating character-by-character on multiorder code groups delivered to a controlling relationship therewith for generating visual display of said multidigit number, means operative to deliver said multiorder code groups, one at a time, in sequence beginning with code groups representing high order digits, into controlling relationship with said display generating means in operative synchronism with said established display times, bistable means having a normally active first state of operation and a normally inactive second state of operation for respectively preventing and permitting output operation of said visual display generating means, and means responsive to delivery of any code group by said delivery means that includes either fractional point or non-zero information for causing said bistable means to change from its first to its second state.

16. Mechanism controlled by multiorder permutation code groups for displaying multidigit numbers wherein said multiorder code groups each identify both a specific numerical character and the presence or absence of a fractional point immediately adjacent thereto, said display mechanism comprising:

means for storing the multiorder code groups for a multidigit number, means for establishing sequential character display times, means operating character-by-character on multiorder code groups delivered to a controlling relationship therewith for generating visual display of said multidigit number, means operative to deliver said multiorder code groups, one at a time, in sequence beginning with code groups representing low order digits, into controlling relationship with said display generating means in operative synchronism with said established display times, means for counting display times after display of a fractional point, and means controlled by said counting means for visually separating digits displayed after the display of said fractional point into multiple digit groups.

17. Display mechanism as defined in claim 16 further comprising:

means operative prior to delivery of any code groups of the multidigit number by said delivery means for modifying all high order zero code groups therein to each include an indication of a fractional point associated therewith, and means operative prior to the display controlled by each code group and responsive to the presence of a fractional point indicating a high order zero, for preventing output operation of said visual display generating means.

18. Mechanism controlled by multiorder permutation code groups for displaying multidigit numbers wherein said multiorder code groups each identify both a specific numerical character and the presence or absence of a fractional point immediately adjacent thereto, said display mechanism comprising:

means for storing the multiorder code group for a multidigit number, means for establishing sequential character display times, means operating character-by-character on code groups delivered to a controlling relationship therewith for generating visual display of said multidigit number, means operative prior to the delivery of any code group of the multidigit number to said controlling relationship, for modifying all high order zeros code groups therein to each include an indication of a fractional point associated therewith, means operative to deliver said code groups, one at a time, beginning with code groups representing low order digits, into controlling relationship with said display generating means in operative synchronism with said established display times, and means operative prior to the display controlled by each code group and responsive to the presence of a fractional point indicating a high order zero, for preventing output operation of said visual display generating means.

References Cited

UNITED STATES PATENTS

| | | | |
|---|---|---|---|
| 3,104,387 | 9/1963 | Loshin | 340—324 |
| 3,358,125 | 12/1967 | Rinaldi | 335—92 |
| 2,754,450 | 7/1956 | Bland. | |
| 2,987,715 | 6/1961 | Jones. | |
| 3,213,441 | 10/1965 | Shook. | |

JOHN W. CALDWELL, *Primary Examiner.*

A. KASPER, *Assistant Examiner.*

U.S. Cl. X.R.

235—198; 315—18, 22; 340—172.5